Patented Oct. 18, 1949

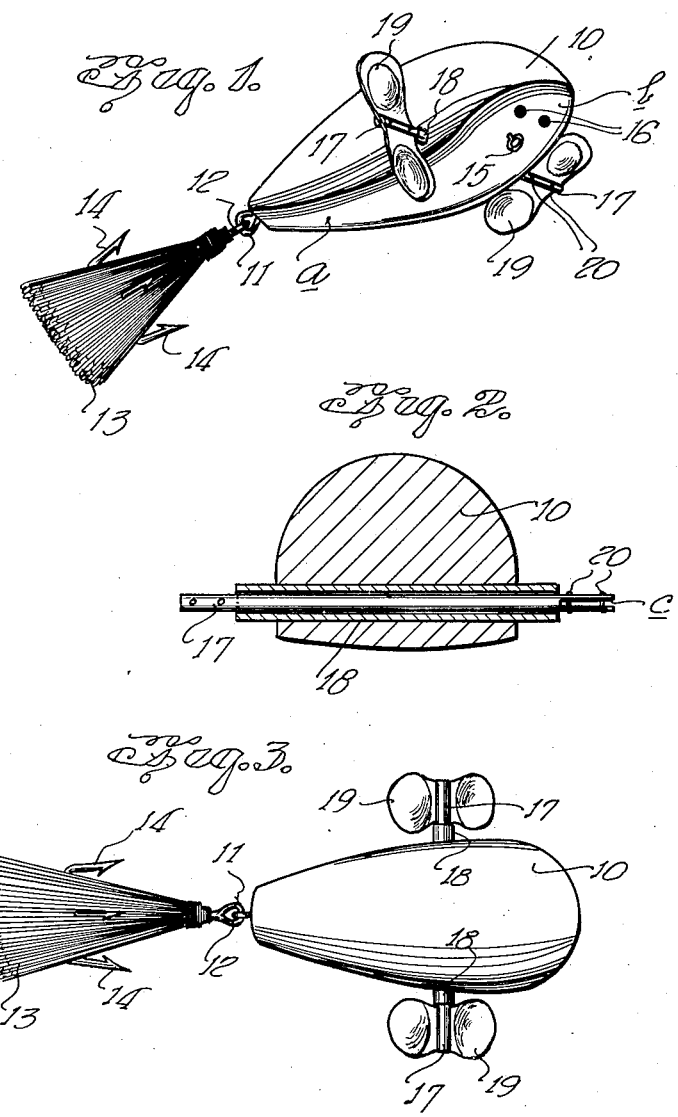

2,485,053

UNITED STATES PATENT OFFICE 2,485,053

ARTIFICIAL FISH LURE

Floyd H. Layfield, Powell, Tex.

Application October 15, 1945, Serial No. 622,278

2 Claims. (Cl. 43—42.13)

This invention relates to fishermen's supplies and equipment and it has particular reference to artificial bait.

The principal object of the invention is to provide an artificial fish lure having a plug body whose underside is especially designed to plane the surface of the water and having trailing hooks semi-concealed by feathers, hairs or other embellishment. Moreover, among the novel characteristics of the bait, the body has a transverse bushing in which revolves a shaft, carrying on each end thereof a water vane transverse to the axis of the shaft and whose ends are cupped or concavo-convexed so that it will revolve rapidly as the bait is reeled through the water. Thus is created through sound and motion an incentive for a game fish to strike.

Another object of the invention is to provide an artificial fish lure of inexpensive construction having certain features of animation attractive to fish by virtue of its ability to create the effect of a live creature seeking to rise from the surface of the water. Rapid movement of the water vanes at the sides of the lure body simulate the action of the wings of a bird or large insect, creating a whirring sound as they disturb the surface of the water in traveling thereacross.

With the foregoing objects as paramount, the invention has further reference to certain features of accomplishment which will become apparent as the description proceeds, taken in connection with the accompanying drawings wherein:

Figure 1 is a perspective, underside view of an artificial lure constructed according to the invention.

Figure 2 is a view thereof in transverse cross-section, longitudinally through the shaft, and Figure 3 is a plan view of the lure.

Continuing with a more detailed description of the drawing, reference numeral 10 denotes a plug body of any desired material whose upper portion is arcuated both along the longitudinal and the transverse axes. The undersurface of the lure is curved conversely to produce a gradual rise towards the tail of the body and a more or less abrupt rise towards the front or nose thereof. These latter curves are indicated respectively at $a$ and $b$.

Threaded into the tail of the body 10 is a screw having an eye 11, to which is attached an eye 12, providing a pivot for the tail 13 of the lure, which may be of any desired or suitable design. Concealed or semi-concealed in the tail 13 are hooks 14 of conventional manufacture. Under the nose or forward portion of the body 10, there is provided an eyelet 15 and above this eyelet, inserts 16, simulating eyes are secured in the body. These may, of course, be pointed or otherwise affixed to the body 10.

Chief among the novel characteristics of the lure is the provision through which is simulated the efforts of an insect or bird to rise from the surface of the water as the lure is trawled therethrough. To accomplish these effects, which incite fish to strike the lure, a shaft 17 is passed through a bushing 18 which latter extends transversely through the body 10 at a point spaced forwardly of its midsection and slightly below its major axis. The ends of the shaft are bifurcated at $c$ (Fig. 2), the slots being at relative right angles. Received at their midsections in these slots are water vanes 19 whose major axes, in view of the relationship of slots $c$, are likewise at right angles.

The ends of the water vanes 19 are oppositely concaved in order that when the lure is caused to travel through the water in trawling, the vanes will revolve, causing agitation of the water at the surface as well as creating a fluttering or whirring sound calculated to attract fish.

Not only do the vanes create the described results but, by virtue of their cross axes, they produce a certain amount of vascillation in the movement of the body 10 as the latter is reeled in, thereby resulting in further animation and consequent attractiveness of the lure.

To secure the vanes 19 in the slots $c$, of the shaft 17, small pins 20 are employed or they may be soldered in position, as desired.

Manifestly, the construction as shown and described is capable of some modification and such modification as may be construed to fall within the scope and meaning of the appended claims is also considered to be within the spirit and intent of the invention.

What is claimed is:

1. An artificial fish lure including a plug body having tail hooks, a tube extending transversely through said body and projecting from each side thereof, a shaft rotatable in said tube, said shaft having bifurcated ends, water vanes carried by the bifurcated ends of said shaft having oppositely concaved ends, and means at the forward end of said body to receive a trolling line.

2. An artificial fish lure including a plug arcuated both longitudinally and laterally and having tail hooks thereon, a tube extending transversely through and beyond the sides of said body, a shaft rotatable in said tube, means mounted on each end of said shaft for agitating water as the body is drawn through water, and means on the front end of said body for receiving an end of a trolling line.

FLOYD H. LAYFIELD.

REFERENCES CITED

The following references are of record in the file of this patent:

UNITED STATES PATENTS

| Number | Name | Date |
|---|---|---|
| D. 80,124 | Intingaro | Dec. 17, 1929 |
| 1,313,476 | Ewert | Aug. 19, 1919 |
| 1,538,658 | Rindt | May 19, 1925 |